Patented Nov. 26, 1940

2,223,293

UNITED STATES PATENT OFFICE 2,223,293

METHOD OF MAKING HYDROUS SODIUM SILICATES

George R. McDaniel, Cincinnati, Ohio, assignor to Diamond Alkali Company, Pittsburgh, Pa., a corporation of Delaware No Drawing. Application August 26, 1938, Serial No. 226,988

7 Claims. (Cl. 23—110)

This invention relates to a new method for producing crystalline sodium silicates in stable, hydrated form, and also to a series of silicate compositions which are new in the art.

In connection with the present disclosure, attention is invited to my copending patent application Serial No. 88,645, filed July 2, 1936, now issued as United States Patent No. 2,131,718, dated September 27, 1938.

In my copending application there is disclosed a process for manufacturing sodium silicates which are more alkaline than the sodium meta- and sesquisilicates. These more alkaline silicate compositions, to which both the present invention and the invention of my copending application are directed, are comprised of from approximately 1.75 to 2.25 molecular parts of sodium oxide to each molecular part of silicon dioxide, together with a quantity of water which is present as water of hydration. The compositions of this range are known broadly in the industry as "orthosilicates," though, from the strict chemical point of view, the orthosilicate is a chemical composition in which two molecular parts of sodium oxide are combined with one molecular part of silica. Just as in the case of a metasilicate, one part of the metal oxide is combined with one part of silica; and in the sesqui- or pyrosilicate, one and one-half parts of the oxide is present for each molecular part of silicon dioxide.

In the copending application there is disclosed a process for making these "orthosilicate" materials in the form of stable and yet hydrated crystals, particles and flakes. This process is predicated upon the discovery that liquid solutions which are composed of silicon dioxide and sodium oxide in the molecular proportions appropriate for providing a desired ratio of components in the ortho range may be crystallized by the application of heat. These solutions contain an amount of water which is sufficient to provide the desired hydrate, but which is not in such excess that evaporation of water is requisite before crystallization can be made to take place. While it has always been the experience that crystallisis is induced by supercooling, the process which is disclosed in the copending application is based, paradoxically, upon the discovery that the ortho liquids there disclosed readily are crystallizable by the application of heat, rather than the removal of it. The process, therefore, may be and is designated a process of thermal crystallization.

In the process of thermal crystallization which is disclosed in the copending application the "ortho" liquors are established by dissolution of a suitable material providing silicon dioxide, and a suitable material providing sodium oxide, together with or in the presence of a quantity of water which is limited in amount, but which is sufficient to enable the formation of a crystalline hydrate. For instance, dry 76% lye flake is dissolved in molten metasilicate liquor in such quantity that the proportion of sodium oxide to silicon dioxide is within the range of approximately 1.75 to 2.25 $Na_2O$ to $1SiO_2$. The water content, which is obtained either from the silicate liquor, or by direct addition, is such that the liquid or "liquor" which is so established will be sufficient to provide approximately 5 to 7 molecules of water of hydration without there being any later substantial evaporation of water. Next, this liquid is heated, for the thermal crystallization of it, to elevated temperature, for instance, to a temperature within the range of approximately 100–150° C. With this application of heat, transformation of the liquid into a crystallitic solid takes place promptly and is complete after a short period of time. In the general process, therefore, a crystallitic solid of a given composition within the range specified is prepared by heating to an elevated temperature a liquid of the same composition.

The improvement of the invention disclosed in the copending application, to which the present patent application is directed, is predicated upon the concept of preparing the liquid which is to be transformed into the crystallitic solid at a temperature which is sufficiently high to effect solidification and crystallization of the liquor when it is permitted to stand for a short period without subsequent or further additions of heat. In the present process the material providing sodium oxide, the material providing silicon dioxide and the water which is contained in the source of silicon dioxide, or which is added by direct addition, are brought together to constitute the ortho liquor of the desired chemical proportions, at a temperature which is sufficiently high to enable this liquor to crystallize of its own volition when it is permitted to stand for a short period.

The crystallization takes place without loss of water, excepting inconsequential amounts that do not disturb or prevent the desired hydrates from being obtained. In the present method, therefore, "ortho" liquor containing an amount of sodium oxide which is sufficient to provide approximately 1.75 to 2.25 molecular parts for each molecular part of silicon dioxide, and containing an amount of water which is sufficient to provide approximately 5 to 7 molecules of water of hydration without substantial evaporation is prepared at a temperature sufficiently high to enable this liquor to crystallize into a stable, hydrous crystallitic solid, without further or substantial additions of heat and within a period of time shortly after it has been prepared.

The temperature at which the solutions are prepared is, for the most part, within the range of approximately 100° C. to 140° C. at atmospheric pressure. If the temperature is lower, then subsequent additions of heat may be necessary to crystallize the liquid. As disclosed in my copending application, the life of these liquids during which they may be crystallized is relatively short. If the materials are not crystallized during this useful period of life, they tend to deteriorate into mushy masses. Therefore, the lower limit of the temperature need be such that crystallization proceeds when the liquor is permitted to stand for a short period of time directly after its preparation. On the other hand, if the temperature be too high, or if the high temperature be maintained for a prolonged period, then there is danger of actual dehydration of the crystals after they have formed. This is undesirable because the dehydrated or anhydrous substances are much more difficult to dissolve than those which are hydrated.

The feature of the present invention which makes it particularly useful in the commercial production of the alkaline silicates of the general ortho range is that the liquors may be prepared in appropriate tanks or vessels at the elevated temperature and then be permitted to crystallize to solid cakes without further processing.

The solid cakes exhibit a lamellar crystal structure and, for this reason, these cakes are frangible and therefore specifically suited to be ground in the conventional grinding mills which are available in most of the silicate plants. Further drying before grinding is unnecessary. Granular materials composed of particles of specific and predetermined size are produced directly from the cakes by the employment of conventional sieves.

There is at times slight exudation of liquid at the interfaces between the crystal plates of the lamellar structure. This exudate is small in quantity and, when it appears, is visible only as a thin film of liquid upon crushed fragments. These fragments and the cakes in which they are contained are crushed and comminuted in the usual way, and the exudate does not cause complications in the grinding or crushing or sieving procedure. Sometimes this exudate is expelled from the mass of a cake as the crystallization of it proceeds to completion, and collects as a liquid layer at the top of the cake. When this occurs this liquid is simply drained off by pouring it from the crystallizing pan shortly after the material has solidified, and the crushing is next done in the usual manner.

The products which are so produced are stable; they do not become caked or deteriorate when they are stored in the containers for extended storage periods, and they are further very valuable for the reason that the water of hydration which they contain makes them dissolve very easily and quickly in water.

Grinding is best done while the cakes or crushed material are still hot. The silicate liquor preferably is established in a drum, or pan or kettle equipped either with a steam heating coil or with appropriate burners. The kettle or pan also should be equipped with a removable mechanical mixer capable of effecting dissolution of the sodium oxide, water and silicon dioxide components with one another during the preparation of the liquor. The liquor prepared in the kettle next discharged is permitted to stand as is, until it solidifies to crystallitic solid state, after which it is removed therefrom. The kettles preferably are of conical shape, so that the cakes drop out from them easily, when they are overturned. Expansion of the material takes place during the crystallization and the kettles are best constructed to accommodate an expansion of one-quarter to one-half inch in circumference for each 3 feet of circumference, without buckling.

In place of casting the liquor directly in the pans from a preparing kettle, small quantities of the material may be made directly in the casting pans or other suitable containers and permitted therein to crystallize.

The following examples will illustrate the commercial practice of the invention with the employment of several different sources of silicon dioxide.

EXAMPLE 1

*Preparation of the composition*
$1.75Na_2O \cdot 1SiO_2 \cdot 5.H_2O$
*from sodium metasilicate*

To 200 parts by weight of sodium metasilicate liquor, ($Na_2SiO_3.5H_2O$), at the boiling temperature (116–118° C) are added 57.7 parts by weight of caustic soda (76% lye flake) with rapid stirring. The caustic soda dissolves completely upon stirring about one minute, when the liquid begins to increase in viscosity and becomes thick. The stirrer should be removed at this point, after which the liquor quickly sets to a hard frangible mass. Thermal crystallization is fully complete in about one-half hour or less.

EXAMPLE 2

*Preparation of hydrated sodium orthosilicate $Na_4SiO_4 \cdot 6H_2O$, from sodium metasilicate*

To sodium metasilicate liquor ($Na_2SiO_3 \cdot 5H_2O$) at its boiling temperature, approximately 116–118° C., caustic soda (76% lye flake) is added in the following proportions:

| | Parts by weight |
|---|---|
| Metasilicate liquor | 200 |
| Caustic soda (76% lye flake) | 76.9 |

The size of the batch preferably should be such that not much longer than 15–30 seconds of time is required for the actual addition of the caustic. The dissolution, of course, is carried out with rapid stirring. The stirring is continued for about 45 seconds longer, at which point of time the solution begins visibly to thicken. It will be found that the caustic soda has completely dissolved within this interval of time. After aging approximately one-half hour the mass of material will have set to a hard, frangible, thermally crystallized body of hydrated sodium orthosilicate. The container may be insulated to hold the sensible heat, if desired. While still hot, if desirous, the cake of sodium orthosilicate may be crushed and ground to any desired degree of fineness; in such case, the sensible heat in the material will be found sufficient to remove any surface moisture that may be present.

Example 3

*Preparation of the composition,*
*2.25Na₂O·1SiO₂·7H₂O,*
*from sodium metasilicate*

| | Proportions parts by weight |
|---|---|
| Sodium metasilicate liquor, (Na₂SiO₃.5H₂O) | 200 |
| Water | 10.8 |
| Caustic soda (76% lye flake) | 96.2 |

The water is mixed with the sodium metasilicate liquor and the resulting solution heated to the boiling point. The caustic soda is then dissolved in the sodium metasilicate solution in the manner described in Example 2 to produce thermal crystallization.

Example 4

*Preparation of sodium orthosilicate,*
*Na₄SiO₄·6H₂O,*
*from 60° Baumé silicate of soda (waterglass)*

Silicate of soda of 60° Baumé, which is the preferred starting point according to this example, has a molecular ratio of 1Na₂O to about 1.93SiO₂. The following analysis is typical of this grade:

| | Per cent |
|---|---|
| Na₂O | 18.7 |
| SiO₂ | 35.0 |
| H₂O | 46.3 |
| Total | 100.0 |

According to this method of preparation of orthosilicate, approximately 141.1 parts by weight of caustic soda (76% lye flake), the preferred source of Na₂O, is dissolved with rapid stirring in 200 parts by weight of the 60° Baumé silicate of soda at a temperature of 80 to 90° C. The dissolution of the caustic soda is accompanied by a rise in temperature of the solution of approximately 30 to 40° C. After solution of the caustic soda, which occurs in about one minute with rapid stirring, the mass of liquid sets to a hard, frangible cake of solid sodium orthosilicate within approximately one-half hour.

Having described my invention, I claim:

1. A method of preparing a stable, crystalline, hydrous, sodium silicate, which method comprises, mixing reagents, at least one of which is hot and thereby preparing a hot liquor containing approximately 1.75 to 2.25 molecular parts of sodium oxide to each molecular part of silicon dioxide, and containing an amount of water controlled to provide approximately 5 to 7 molecules water of hydration and permit of crystallization of substantially all of the liquor, without evaporation of water therefrom, the temperature of the prepared hot liquor being above 100° C. and capable of effecting thermal crystallization of the liquor, without further addition of heat, when it is permitted to stand after it has been prepared, but not sufficiently high to evaporate any substantial quantity of water therefrom, and causing substantially all of this liquor to crystallize to solid state by permitting it to stand without substantial reduction of the elevated temperature until crystallization is complete.

2. A method of preparing a stable, crystalline, hydrous, sodium silicate, which method comprises, mixing reagents, at least one of which is hot, and thereby preparing a hot liquor comprised of approximately 1.75 to 2.25 molecular parts of sodium oxide to each molecular part of silicon dioxide, and an amount of water sufficient to produce a hydrate and insufficient in amount to prevent crystallization of substantially all of the liquor by adding caustic soda to hot meta silicate liquor, the preparation of the liquor taking place at a temperature above 100° C. and sufficiently high to effect thermal crystallization of the liquor when it is permitted to stand for a period of time without substantial reduction of its temperature, and crystallizing said liquor at said temperature above 100° C. by casting it in pans and therein permitting it to stand without further addition of heat.

3. A method of preparing a stable, crystalline, hydrous, sodium silicate, which method comprises the step of mixing and dissolving caustic soda in hot liquid metasilicate in sufficient amount to obtain a solution containing approximately 1.75 to 2.25 molecular parts of sodium oxide to each molecular part of silicon dioxide, in the presence of an amount of water sufficient to produce a hydrate and to permit of crystallization of substantially all of the liquor to a solid without substantial evaporation of water, the temperature of the hot meta silicate liquor being such that as the caustic soda is added to it and the liquor is prepared its temperature is above approximately 100° C. and sufficiently high to cause the liquor to solidify to a hard grindable mass when permitted to stand and then crystallizing said liquor at said temperature above approximately 100° C. by permitting it to stand without further addition of heat.

4. The method of preparing a stable, hydrous, sodium silicate, which comprises mixing reagents, at least one of which is hot, and thereby preparing a hot liquor containing approximately 1.75 to 2.25 molecular parts of sodium oxide for each molecular part of silicon dioxide, and containing an amount of water sufficient to produce a hydrate but not in substantial excess of an amount which will permit of crystallization of substantially all of the liquor to a solid state without evaporation of water, the preparation of the liquor being conducted at an elevated temperature which is above 100° C. and sufficiently high to cause the liquor to crystallize, without evaporation of water from it, to a solid state, when the liquor is permitted to stand for a period of time directly after it has been prepared, and then causing said liquor to crystallize at elevated temperature by permitting it to stand, and finally grinding the solid material until it is of granular form.

5. The method of preparing a stable, hydrous, sodium silicate, which comprises mixing reagents, at least one of which is hot, and thereby preparing a hot liquor containing approximately 1.75 to 2.25 molecular parts of sodium oxide for each molecular part of silicon dioxide and containing an amount of water sufficient to provide approximately 5 to 7 molecules of water of hydration, and insufficient to prevent crystallization of substantially all of the liquor without substantial evaporation of water, at a temperature in the range of about 100° C. to 140° C., and then permitting the liquor to crystallize at this temperature to a hard grindable cake.

6. The method of preparing a stable, hydrous, sodium silicate, which method comprises admixing molten sodium metasilicate with hot caustic soda at a temperature sufficiently high to provide a temperature of about 100° C. to 140° C. when the caustic soda has reacted with the metasilicate in such proportion that approximately 1.75 to 2.25 molecular parts of sodium oxide are present for each one molecular part of silicon dioxide, and in the presence of a quantity of moisture which is sufficient in amount to provide about 5 to 7 molecules of water of hydration, but which is insufficient in amount to prevent crystallization of substantially all of the liquor without substantial evaporation of water, and then permitting the liquor to crystallize at said elevated temperature, shortly after it has been prepared, to a stable crystallitic solid, grindable cake.

7. The method of making a stable, hydrous sodium silicate, which method comprises making, at an elevated temperature and over a short period of time, a solution which contains approximately 1.75 to 2.25 molecular parts of sodium oxide to each molecular part of silicon dioxide and which contains water calculated in amount to provide approximately 5 to 7 molecules water of hydration, by combining caustic soda, and sodium silicate, at least one of which is hot and, if necessary, water, in the proportions requisite to provide such solution, the elevated temperature at which the solution is made being above approximately 100° C. and sufficiently high to enable the solution to solidify in substantially its entirety to a hard, grindable mass when permitted to stand, and then causing said mass to crystallize at said elevated temperature by permitting it to stand without evaporating water from it or adding heat to it.

GEORGE R. McDANIEL.